Patented Feb. 28, 1939

2,148,951

UNITED STATES PATENT OFFICE 2,148,951

ORGANIC STARCH DERIVATIVES AND PROCESS

Robert W. Maxwell, Wilmington, Del., assignor to E. I. du Pont de Nemours & Company, Wilmington, Del., a corporation of Delaware No Drawing. Application April 15, 1937, Serial No. 137,143

15 Claims. (Cl. 260—209)

This invention relates to high viscosity derivatives of starch, more particularly it relates to derivatives of starch which have been rendered of greatly increased viscosity while still remaining soluble, by the introduction of a very small amount of a polyfunctional group, still more particularly it relates to the preparation of water-soluble, high viscosity derivatives of starch by the introduction of a very small amount of a bifunctional etherification or esterification agent. It relates further to the preparation of water-soluble high viscosity derivatives of starch by the introduction of a small amount of a bifunctional reagent in connection with precedent, simultaneous or subsequent treatment of the starch material with a monofunctional reagent. In a more limited sense, it pertains to the use of said high viscosity derivatives as thickening agents in the textile and related arts. It also relates to improved printing pastes containing said high viscosity derivatives of starch, and to process for preparing the same.

This invention has as an object the production of high viscosity starch derivatives. A further object is the production of water-soluble high viscosity starch derivatives. A still further object is the preparation of starch derivatives of high viscosity which are soluble in aqueous solutions and/or organic solvents, and mixtures thereof which may be used commercially throughout the arts as thickening agents. A further object is the production of high viscosity starch derivatives in commercial quantities. A still further object is the production of water-soluble starch derivatives which have pronounced adhesive properties. Other objects include the preparation of improved printing pastes which give stronger prints and are economical to use. Other objects will appear hereinafter.

The above and other objects may be accomplished by the following invention wherein starch or a modified starch or a water-soluble derivative thereof is reacted with a small amount of a polyfunctional reagent under such conditions that at least two of the functional groups in the same molecule of the reagent react. In a preferred and more limited sense, they are accomplished by reacting starch, modified starch or a water-soluble derivative thereof with a small amount of a bifunctional agent selected from the group consisting of etherification and esterification agents and mixtures of the same including mixed etherification and esterification agents and mixed etherification or mixed esterification agents. Several variations of the invention include the treatment of starch, modified starch or a water-soluble derivative thereof first with a monofunctional agent and then with a bifunctional reagent, the simultaneous treatment of the starch with a mono- and bifunctional reagent, and the treatment with a bifunctional reagent first and subsequently with a monofunctional agent.

In the present invention bifunctional reagents which react bifunctionally under the reaction conditions are used: It is to be emphasized that certain reagents which appear to be bifunctional reagents do not react as such without additional reaction inducing, but not catalytic, means, these means being called in the art "impellors". Phthalic anhydride thus reacts with starch hydroxyls as a monofunctional reagent, i. e., with one hydroxyl group of the starch nucleus, the second carboxyl being inert. If an impellor is used so that the second carboxyl also reacts, an insoluble derivative is formed, or if the amount of phthalic anhydride used is small and other solubilizing groups are present, a derivative of greatly increased viscosity is produced. If a dibasic acid is mixed with one mol of benzoyl chloride in the presence of pyridine and a starch derivative treated with the mixture, a soluble derivative may be obtained. This is presumably because the benzoyl chloride and the dibasic acid react to form an intermediate anhydride-acid which is monofunctional since it contains only one anhydride group.

$C_6H_5COCl + (CH_2)_x(COOH)_2 \rightarrow$
$C_6H_5CO.O.CO.(CH_2)_xCOOH$

If, however, two mols of the benzoyl chloride are used for one mol of the dibasic acid in the presence of pyridine and a starch derivative containing free cellulosic hydroxyls is brought to react with it, an ester may be formed in which the starch nucleus is esterified by both carboxyl groups of the dibasic acid, and an insoluble derivative formed; or when only small amounts of reagent are used and other solubilizing groups are present, a product of greatly increased viscosity may be the result. Presumably, this is because the benzoyl chloride impellor reacts with the dibasic acid to form a di-anhydride which is polyfunctional because it contains two anhydride groups.

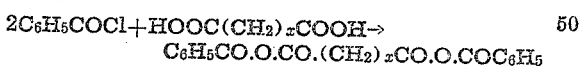

$2C_6H_5COCl + HOOC(CH_2)_xCOOH \rightarrow$
$C_6H_5CO.O.CO.(CH_2)_xCO.O.COC_6H_5$ I have found that the use of bifunctional reagents under such conditions that both functional groups react leads to the formation of high viscosity soluble, and even to insoluble derivatives. For example a starch derivative containing free hydroxyl groups, soluble in solvents when treated with a bifunctional reagent such as beta, beta'-dichlorodiethyl ether can be rendered completely insoluble in all solvents if the bifunctional reagent is used in large proportions. However, if the degree of substitution by the bifunctional reagent is reduced sufficiently either by limiting the quantity of reagent or the time through which it acts products are obtained which are no longer insoluble but which can be dispersed in the customary solvents for similar starch derivatives containing no bifunctional substituents.

The term "soluble" and "insoluble", as used in this specification, require definition. A starch derivative is described as "soluble" if it gives a macroscopically homogeneous "solution" with a quantity of solvent which is more than sufficient to effect maximum swelling. A derivative is said to be "insoluble" when it can be easily distinguished as a separate phase in the solvent liquid after solute-solvent equilibrium has been attained.

The invention will be further illustrated but is not limited by the following examples in which the quantities are stated in parts by weight.

*Example I*

A mixture is made of 50 parts of water and 1 part of epichlorohydrin with 16.2 parts of potato starch (dry basis). After stirring the mixture well, 16.2 parts of sodium hydroxide dissolved in 80 parts of water are added and stirred in. The mixture, on standing at room temperature, thickens slowly to an extremely viscous solution. If the reaction is allowed to proceed further, the product is a gel. The reaction can be stopped at any desired viscosity by neutralizing the remaining caustic.

*Example II*

Sixteen and two-tenths (16.2) parts of potato starch is gelatinized in 94 parts of a 5% aqueous solution of sodium hydroxide by heating on the steam bath for one-half hour. The mixture is stirred continuously. The uniform mixture of alkali starch is then cooled to room temperature and 9.2 parts of epichlorohydrin is stirred in. Within fifteen minutes the mixture sets to a rubbery-like gel. This gel is swelled slightly by water but is insoluble in all solvents.

*Example III*

A mixture is made of 81 parts of potato starch and 250 parts of water. To this is added 20 parts of sodium hydroxide dissolved in 130 parts of water, and the mixture is heated on a steam bath until the starch has been gelatinized. To the cooled alkali starch solution is added 35.5 parts (0.5 mol) of beta:beta'-dichlorodiethyl ether, with stirring sufficient to emulsify the latter reagent in the aqueous solution. The reaction mixture is then maintained at a temperature of 50±5° C. on the steam bath for six hours, with occasional stirring. Samples withdrawn after two and after four hours of the heating period were diluted with water and stirred, with mild warming, until uniformity had been attained. After cooling, they were neutralized with dilute acetic acid and diluted with an equal volume of methanol to separate the carbohydrate as a rubbery elastic mass. The main portion of the reaction mixture was treated in similar fashion at the end of six hours' heating. The product obtained from the sample withdrawn after two hours of heating was insoluble in, but swelled by water. It dissolved in 5% aqueous sodium hydroxide to yield a solution of much higher viscosity than a similar solution of the starch used as starting material. It was insoluble in organic solvents. The products obtained from the reaction mixture after four and six hours of heating were swelled, but not dissolved by water or aqueous caustic soda solution. They were insoluble in organic solvents.

*Example IV*

A mixture was made of 16.2 parts of cornstarch with 32 parts (8 mols) of sodium hydroxide dissolved in 48 parts of water by heating and stirring until a uniform mixture resembling a moist clay was obtained. This mixture was transferred to a steam-jacketed Werner-Pfleiderer mixer and reacted in the mixer with 57 parts (4 mols) of beta:beta'-dichlorodiethyl ether for 6.5 hours at 82±3° C. (as recorded by a thermometer dipped periodically into the reaction mass). The carbohydrate product was separated from the reaction mixture in a manner similar to that given in Example III except that the procedure was repeated several times to insure complete removal of sodium salts. The dried product, an amorphous horny mass, was insoluble in all solvents, being swelled to some extent in hot water and aqueous caustic solution.

*Example V*

A mixture was made of 16.2 parts of cornstarch, 4 parts of sodium hydroxide, and 70 parts of water in a fashion similar to that described in Example III. This mixture was reacted with 10.7 parts of dichlorodiethyl ether as in Example IV for seven hours at 75±5° C. The product was obtained as a fine white powder by pouring the cold, neutralized reaction mixture into methanol with violent stirring. The powder was insoluble in all solvents but was swelled in water or aqueous solutions.

*Example VI*

The procedure of Example V was followed except that 7.1 parts of dichlorodiethyl ether was used instead of 10.7 parts. The product was similar to that obtained in Example V except that it was swelled to a slightly greater extent in water.

*Example VII*

The procedure of Example V was followed except that 1.8 parts of dichlorodiethyl ether was used. The product had properties similar to those of products obtained in Examples V and VI except that it was swelled to a still greater degree in water. It was insoluble in all solvents.

*Example VIII*

(a) Forty (40) parts of potato starch and 176 parts of water containing dissolved in it 16 parts of sodium hydroxide were mixed to a uniform gelatinous solution by stirring at 70° to 80° C. Forty-seven (47) parts of sodium chloroacetate dissolved in 80 parts of water were thoroughly stirred into the cooled alkali-starch solution. The resulting mixture was allowed to stand for seventy-two hours at 25° C., with only occasional stirring, and then precipitated in methanol, rinsed with ether and dried in the air.

(b) The dried, powdered product from (a) was dissolved in 250 parts of 20% aqueous sodium hydroxide solution, 17.5 parts of dichlorodiethyl ether were stirred in well, and the mixture was heated for seven hours at 70° C. After a short heating time, the mixture became quite thick and stiff. The reaction product, after seven hours' heating, was diluted with 1000 parts of water, made just acid to litmus with dilute acetic acid and precipitated by adding methanol. The precipitated product was dehydrated by repeated washings with methanol, filtered, rinsed with ether, and dried. The product was soluble in water to give very thick solutions much higher in viscosity than the corresponding starch or starch glycolic acid solutions.

Example IX (a) One hundred (100) parts of cassava starch are suspended in 250 parts of water and transferred to a steam-jacketed, nickel-lined Werner-Pfleiderer mixer. To this suspension, while being stirred, are added slowly 6.5 parts of caustic soda dissolved in 50 parts of water. At the same time, the temperature of the mixture is raised gradually to 80° C. When the alkali-starch solution attains uniformity, it is cooled to 30° C. and 10 parts of dimethyl sulfate are worked in gradually. The mixture is stirred one and one-half hours with cooling, heated to 80° C., maintained at 80° C. for fifteen to twenty minutes, tested to confirm alkalinity, cooled and removed from the mixer. The methylated starch is obtained from this solution in the form of a fine white powder by pouring said solution, in a thin stream, into violently agitated methanol, filtering and rinsing the precipitate with acetone or ether before it becomes gummy.

(b) Fifty (50) parts of the powdered product from (a) are treated as in part (b), Example VIII. The product gives with water a very viscous mixture, much higher in viscosity than aqueous dispersions of starch or of the product from (a), a low substituted methyl starch ether.

Example X

This illustrates the enhancement of the viscosity of a soluble starch ester by the use of a very small amount of a bifunctional reagent. In this instance the bifunctional reagent is sebacic acid which acts as an esterifying agent for starch hydroxyl groups with both carboxyl groups in the presence of benzoyl chloride and pyridine.

Four and seven-tenths (4.7) parts of starch acetate having an acetic acid content of 56% were dissolved in 66 parts of pyridine which contained 0.005 part of sebacic acid (one seven hundredth mol of the acid to one mol of the starch acetate). To this solution 1.75 parts of benzoyl chloride (a considerable excess over two mols for each mol of the acid, the excess being added to take care of moisture in the material used) were added and stirred in rapidly. The viscosity of the solution increased over a period of twenty-four hours at room temperature until it was about double the original viscosity and then no further change took place. Upon purification and resolution in solvents for starch acetate, the product was found to be soluble and in each case of increased viscosity, usually about double that of the original.

Example XI

This illustrates a further increase in viscosity of a starch ester by the use of a slight amount of a bifunctional reagent.

The procedure was exactly the same as in Example X except that 0.009 part of sebacic acid (one four hundredth mol of sebacic acid to each mol of cellulose acetate) was used. The results were the same as in Example X except that the viscosity was approximately four times that of the original instead of twice.

Example XII

This illustrates the effect of a still larger amount of a bifunctional reagent.

The procedure was the same as in Example X except that 0.01 part (one three hundred and fiftieth mol) of sebacic acid was used. After twenty-four hours the solution was in a semi-gelled state resembling egg white with a very high viscosity.

The following examples illustrate one important embodiment of the present invention as well as an important use for the products.

Example XIII

The high viscosity starch derivative prepared according to Example VIII (hereafter designated as "starch derivative VIII" (is incorporated into a textile printing paste thickener which is formulated as follows:

|  | Parts |
|---|---|
| Starch derivative VIII | 6.5 |
| British gum | 212.0 |
| Water | 441.5 |
| Potassium carbonate | 170.0 |
| Sodium sulfoxylate or other reducing agent of the type known to the trade as "Rongalit", "Hydraldit", "Sulfoxite C", etc. | 120.0 |
| Glycerol | 50.0 |
|  | 1000.0 |

This printing paste thickener is mixed with a vat dye suitable for dye printing in the proportions:

|  | Parts |
|---|---|
| Vat color | 1- 20 |
| Above thickener | 99- 80 |
|  | 100 100 | the precise concentration of dye depending upon the particular dye being used and the depth of color desired in the prints.

Prints made on both rayon and cotton using a paste of the composition above and the vat color known as "Sulfanthrene Scarlet G" were stronger than similar prints obtained when using a paste formulated as above except that the 6.5 parts of "starch derivative VIII" were substituted by 32 parts of wheat starch.

Example XIV

The procedure of Example XIII was followed except that the printing paste thickener has the following composition:

|  | Parts |
|---|---|
| Wheat (or corn) starch | 32.0 |
| Starch derivative VIII | 8.5 |
| Water | 619.5 |
| Potassium carbonate | 170.0 |
| Sodium sulfoxylate reducing agent | 120.0 |
| Glycerol | 50.0 |
|  | 1000.0 |

The color printing paste is made by combining this paste thickener with a vat dye in the proportions given in Example XIII.

Example XV

The procedure of Example XIII was followed except that the printing paste thickener is formulated as follows:

| | Parts |
|---|---|
| Starch derivative VIII | 15 |
| Water | 645 |
| Potassium carbonate | 170 |
| Sodium sulfoxylate reducing agent | 120 |
| Glycerol | 50 |
| | 1000 |

This thickener is incorporated with a vat dye to form a vat color printing paste as in Example XIII.

Example XVI

Starch derivative VIII is incorporated in a printing paste thickener of the following composition:

| | Parts |
|---|---|
| Starch derivative VIII | 20 |
| Gum tragacanth | 30 |
| Water | 900 |
| Glycerol | 50 |
| | 1000 |

This thickener may be employed for the printing of acid, basic, direct and azoic colors. Examples of the printing color formulas are:

(a) *Acid colors and direct colors*

| | Parts | |
|---|---|---|
| Color | 1– | 4 |
| Water | 19– | 16 |
| Above thickener | 80– | 80 |
| | 100 | 100 |

(b) *Basic colors*

| | Parts | |
|---|---|---|
| Color | 1– | 4 |
| Solvent (alcohol) | 5– | 10 |
| Acetic acid (glacial) | 5– | 5 |
| Water | 18– | 15 |
| Above thickener | 65– | 60 |
| Tannic-acetic acid (1:1) | 6– | 6 |
| | 100 | 100 |

If maximum brilliancy is preferred, the tannin-acetic acid may be eliminated from the above formula.

(c) *Azoic colors*

| | Parts | |
|---|---|---|
| Color | 1.0– | 5 |
| Caustic soda—35% | 0.5– | 3 |
| Water | 28.5– | 22 |
| Above thickener | 70.0– | 70 |
| | 100.0 | 100 |

Example XVII

Starch derivative VIII is used as the only thickening agent in a printing paste thickener for the printing of acid, basic, direct and azoic colors. The thickener may have the following composition:

| | Parts |
|---|---|
| Starch derivative VIII | 30 |
| Water | 970 |
| | 1000 |

This thickener may be substituted in any of the printing color formulas given in Example XVI.

Example XVIII

The high viscosity starch derivative prepared in Example IX is substituted for starch derivative VIII on an approximately equal weight basis in the formula given in Example XVII. Similarly, it may be used to replace starch derivative VIII in any or all of the formulas given in Examples XIII to XVI.

The viscosity and solubility of starch or starch derivative of any source whatever, provided it contains free hydroxyl groups can be similarly modified by reaction with a bi- or polyfunctional reagent under such conditions that at least two of the functional groups react. The more familiar starches are corn, wheat, rice, cassava (tapioca), sago, arrow-root, Irish and sweet potato. Modified starches suitable for treatment include oxidized starches (i. e., oxidized with chlorine, hypochlorite, peroxides, perborates, etc.), other kinds of so-called "soluble starches", partially dextrinized starch such as British gum, etc. Starch ethers, esters and mixed ether-esters, or other substituted derivatives containing unsubstituted hydroxyl groups are susceptible to the described treatment. Among starch derivatives which contain ether groups which render starch water-soluble are methyl and ethyl starch, glycol starch and other hydroxyalkyl starches, and starch glycolic acid. Among useful starch esters are starch acetate, propionate, sulfate, etc. Mixed derivatives such as methyl-ethyl starch, methyl starch acetate, ethyl starch glycolate are also useful.

The term "starch material" as used in this specification is meant to include not only the usual types of starches but also chemically modified or soluble starches as well as water-soluble starch derivatives which still contain the starch nucleus, such as starch ethers, esters of organic and inorganic type, ether acids and ether esters.

Bifunctional reagents of the etherification and esterification type may be used in accordance with this invention. In fact, in some instances, tri- and other polyfunctional reagents may be used in accordance with the teachings of this invention, however, with less satisfaction than when reagents having more than two functional groups are employed. The use of bifunctional etherification agents represents the preferred embodiment of the invention. As examples of useful agents of this type mention is made of epichlorohydrin, beta:beta'-dichlorodiethylether and its homologues, beta:beta'-dibromdiethyl sulfide, and sulfone. Among useful esterification agents are succinic, adipic, sebacic, phthalic, and other di-basic acids.

The variety of reactions to which this invention is applicable precludes the possibility of setting limits to the reaction conditions of time, temperature, concentrations, etc. Such conditions must be adapted to the type of starch or starch derivative which is submitted to the treatment and to the particular polyfunctional reagent used. Obviously, some reagents containing highly reactive functional groups will be effective at low temperatures while others, less reactive, will require elevated temperatures to bring about reaction.

Also, it is quite impossible to specifically define the amount of polyfunctional reagent required. This amount will vary with the polyfunctional reagent used, due to differences in the amounts of such reagents effectively lost in side reactions, and will depend to some extent upon the desired degree of modification in solubility and viscosity of the starch derivative. It cannot be determined precisely, by present methods of analysis, just how much polyfunctional reagent must react with the starch to produce insolubility, since that amount is usually so small as to be within the limits of experimental error of the analysis.

The quantity of bifunctional reagent to be used in the reaction can be limited either by controlling the quantities of bifunctional reagent introduced into reaction mass or by limiting the time through which the polyfunctional reagent acts. When the action of monofunctional and polyfunctional reagent takes place simultaneously the quantity of polyfunctional reagent is best regulated by limitation of the amount added. In this case the proper amount can be determined only by running a series of preliminary tests and determining the viscosity and solubility of the resulting products. Where the reaction with the polyfunctional reagent is effected separate from that of a monofunctional reagent the proportion of polyfunctional reagent can be limited either by the quantity of material added to the reaction mixture or the time during which it acts. Where the action of the polyfunctional reagent is to be followed by the action of a monofunctional reagent, or other treatment to improve solubility the proper quantity of polyfunctional reagent to be added or the time through which it acts can be determined only by preliminary tests. If the final product is to be soluble the starch derivative must be of such a nature that it, too, is soluble without the presence of the polyfunctional groups.

The temperature, time and duration of the reaction may vary widely depending upon the particular starch or starch derivative treated, the polyfunctional reagent used, and the amount thereof as well as the viscosity desired. Obviously, some reagents containing highly reactive functional groups will be effective at low temperatures and others, less reactive, will require elevated conditions. Thus, temperatures from about 15° C. to 120° C. and higher have been found to be useful. Temperatures of 15° C. to 80° C. are, in general, the most practical and are preferred when the reaction is carried out under alkaline conditions.

The amount of polyfunctional reagent used may vary widely, as previously stated, depending upon its specific nature as well as that of the starch material treated. In some cases, due to side reactions, the effective amount is considerably below the amount added. In general, it is believed that amounts less than one-fourth of a mol per glucose unit will give soluble derivatives of high viscosity if other conditions are proper. Amounts less than 1/20 are in general preferred when alkaline conditions and bifunctional etherification agents are used. By checking the viscosity of the reaction products as the reaction proceeds, the nature of the final product can best be regulated. By following the procedure of the present invention products increased in viscosity from 25 to 1000% or more may be obtained. Best solubility is obtained when the solubility increase is limited from 100% to 400% and preferred products lie within this range.

The products of the present invention have numerous and exceedingly diverse uses in the arts. One important use for high viscosity starch derivatives produced according to the method of the invention is for thickening agents. The products of the invention find numerous other applications as thickeners, for example, in paper printing pastes, agricultural insecticidal sprays, edible jellies, confectionery, ice-cream icings, margarine, mayonnaise, other edible food products, cod-liver oil emulsions, essential oil emulsions, photographic emulsions, cosmetics and toilet preparations, lotions, detergents, polishing and cleaning compositions, adhesives, etc.

The invention has the advantage that starch or a derivative thereof may be given a high viscosity whereby it finds innumerable uses in the arts. It may even be rendered insoluble and resistant to the action of any solvent. It possesses the additional advantages that low molecular weight starch derivatives having low viscosities may be given a high molecular weight and a high viscosity. The products have greater thickening power than starches and may be used to wholly or partially replace said thickeners in numerous applications.

Because of their high viscosity, these new starch derivatives may be used at relatively low concentrations and, hence, a smaller amount of thickener is required for a given purpose than when the aforementioned materials are employed. Since the primary function of a thickening agent is to impart increased viscosity to a mixture in which it is incorporated, the advantages of a thickener of extremely high viscosity are readily apparent. Desired thickening action may be secured without using an excessive amount of thickening agent, and in many applications the increasing of the viscosity of a mixture without any appreciable increase in the solids content of said mixture is important. For example, in the printing of textile fabrics, in order successfully to employ the coloring materials a soft thickening material must be added thereto in order to obtain clear and satisfactory printing. After completion of the printing operation, this thickening material must be removed from the fabric and the ease of its removal is an important consideration. It is obvious that the less of such thickening material there is present in the printing paste, the more easily can it be washed out of the fabric. The products of the present invention have superior and unexpected properties in printing pastes and in printing.

A distinct advantage of the starch glycolic acid-beta:beta'-dichlorodiethyl ether reaction product tested as a thickener to replace wheat starch in textile printing pastes, is that the former can be used by merely stirring it into water without heating whereas the latter must be boiled for the preparation of a paste. It has been found that this starch derivative will replace ten parts of wheat starch when used in substantially neutral solutions, and five parts of wheat starch when used in strongly alkaline solutions.

As many apparently widely different embodiments of this invention may be made without departing from the spirit and scope thereof, it is to be understood that I do not limit myself to the specific embodiments thereof except as defined in the appended claims.

I claim:
1. The process of producing starch derivatives of high viscosity which comprises reacting a soluble starch material containing free hydroxyl groups with a small amount of a bifunctional reagent which reacts with starch through two functional groups of the same molecule of said reagent, and stopping the reaction when a substantial increase in viscosity has been obtained.

2. The process of producing starch derivatives of high viscosity which comprises reacting a soluble starch material containing free hydroxyl groups with a reagent containing from about 1/100 mol to about 1/4 mol of a bifunctional reagent which reacts with starch through two functional groups of the same molecule of said reagent, per glucose unit and stopping the reaction when a substantial increase in viscosity has been obtained.

3. The process of producing starch derivatives of high viscosity which comprises reacting a water-soluble starch material containing free hydroxyl groups with a small amount of bifunctional reagent which reacts with starch through two functional groups of the same molecule of said reagent, and stopping the reaction when a substantial increase in viscosity has been obtained and while the product remains water soluble.

4. The process of producing starch derivatives of high viscosity which comprises reacting a water-soluble starch material containing free hydroxyl groups with a reagent containing from about 1/100 mol to about 1/4 mol of a bifunctional reagent which reacts with starch through two functional groups of the same molecule of said reagent, and stopping the reaction when a substantial increase in viscosity has been obtained and while the product remains water soluble.

5. The process of producing starch derivatives of high viscosity which comprises reacting a soluble starch material containing free hydroxyl groups with a small amount of a bifunctional reagent which reacts with starch through two functional groups of the same molecule of said reagent, taken from the class consisting of etherification and carboxylic acid esterification agents and stopping the reaction when a pronounced increase in viscosity obtains but before insolubility occurs.

6. The process of producing starch derivatives of increased viscosity which comprises reacting a starch material containing free hydroxyl groups with a small amount of a bifunctional reagent which reacts with starch through two functional groups of the same molecule of said reagent, and with a monofunctional reagent said monofunctional reagent being of such a type and present in such a quantity as ordinarily gives a soluble starch derivative and stopping the reaction with the bifunctional reagent when a pronounced increase in viscosity obtains but before insolubility occurs.

7. The process of producing starch derivatives of increased viscosity which comprises reacting a starch material containing free hydroxyl groups with a small amount of a bifunctional reagent which reacts with starch through two functional groups of the same molecule of said reagent, taken from the class consisting of etherification agents and carboxylic acid esterification agents for starch and with a small amount of a monofunctional reagent, the monofunctional reagent being present in such a quantity and being used under such conditions as usually gives a soluble starch derivative and stopping the reaction with the bifunctional reagent at a point at which a pronounced increase in viscosity has been obtained, but before insolubility occurs.

8. The process which comprises reacting a starch material containing free hydroxyl groups with a small amount of a bifunctional reagent which reacts with starch through two functional groups of the same molecule of said reagent, taken from the class consisting of etherification agents and carboxylic acid esterification agents and simultaneously with a monofunctional reagent, the monofunctional reagent being present in such proportions and under such conditions as usually gives a soluble product, the reaction of the bifunctional reagent being stopped when a pronounced increase in viscosity has been obtained but before insolubility occurs.

9. The process which comprises reacting a starch material containing free hydroxyl groups with a small amount of a bifunctional reagent which reacts with starch through two functional groups of the same molecule of said reagent, taken from the class consisting of etherification reagents and carboxylic acid esterification reagents, subsequently reacting the product with a monofunctional reagent in such quantity and in such proportions as usually gives a soluble product, the action of the bifunctional reagent being stopped when a sufficient degree of reaction has been obtained to render the product of substantially increased viscosity but being stopped before water-insolubility occurs.

10. The process which comprises reacting a starch material containing free hydroxyl groups with a small amount of a monofunctional reagent which reacts with starch through two functional groups of the same molecule of said reagent, in such quantity and under such conditions as usually gives a water-soluble starch derivative and subsequently with a small amount of a bifunctional reagent taken from the class consisting of etherification agents and carboxylic acid esterification agents and stopping the reaction with the bifunctional reagent when a substantial increase in viscosity has been obtained but before water-insolubility occurs.

11. The process which comprises reacting starch with a small amount of a bifunctional etherification agent which reacts with starch through two functional groups of the same molecule of said agent, and a monofunctional reagent the monofunctional reagent being present in such quantities and being used under such conditions as usually give a soluble starch derivative, the action of the bifunctional etherification agent being stopped when a substantial increase in viscosity has been obtained but before insolubility occurs.

12. The process which comprises reacting a water-soluble carboxylic acid ether of starch with a bifunctional etherification agent which reacts with starch through two functional groups of the same molecule of said agent, and stopping the reaction when a substantial increase in viscosity has been obtained but before insolubility has been obtained.

13. The process which comprises reacting a water-soluble starch ether with a small amount of a bifunctional etherification agent which reacts with starch through two functional groups of the same molecule of said agent, and stopping the reaction when a substantial increase in viscosity has been obtained but before insolubility has occurred.

14. As new products, derivatives of starch containing attached to the nucleus, a small amount of a polyfunctional group which is attached to the nucleus at least in part through at least two functional groups.

15. The high viscosity water-soluble derivatives of lower aliphatic carboxylic acid ethers of starch containing attached to the nucleus both monofunctional and polyfunctional groups, with the latter attached to the nucleus at least in part, through at least two functional groups.

ROBERT W. MAXWELL.

CERTIFICATE OF CORRECTION.

Patent No. 2,148,951.   February 28, 1939.

ROBERT W. MAXWELL.

It is hereby certified that error appears in the printed specification of the above numbered patent requiring correction as follows: Page 4, first column, line 50, for "Tannic-acetic" read Tannin-acetic; page 5, second column, line 58, for the word "what" read wheat; and that the said Letters Patent should be read with this correction therein that the same may conform to the record of the case in the Patent Office.

Signed and sealed this 4th day of April, A. D. 1939.

Henry Van Arsdale (Seal)   Acting Commissioner of Patents.